United States Patent [19]

Coulon

[11] Patent Number: 5,413,641

[45] Date of Patent: May 9, 1995

[54] LASER NITRIDING AN ELEMENT MADE OF TITANIUM ALLOY BY BLOWING NITROGEN AND INERT GAS

[75] Inventor: André Coulon, Bessoncourt, France

[73] Assignee: GEC Alsthom Electromecanique SA, Paris, France

[21] Appl. No.: 131,946

[22] Filed: Oct. 8, 1993

[30] Foreign Application Priority Data

Oct. 9, 1992 [FR] France .................. 92 12020

[51] Int. Cl.$^6$ ...................... B23K 26/00; B23K 27/00
[52] U.S. Cl. .................. 148/224; 148/559; 148/903
[58] Field of Search .................. 148/224, 559, 903

[56] References Cited

U.S. PATENT DOCUMENTS

| 4,299,860 | 11/1981 | Schaefer et al. | 148/903 |
|---|---|---|---|
| 4,414,038 | 11/1983 | Dausinger et al. | 148/565 |
| 4,451,302 | 5/1984 | Prescott et al. | 148/238 |
| 4,539,461 | 9/1985 | Benedict et al. | 148/565 |
| 4,825,035 | 4/1989 | Moriyasu et al. | 148/903 |

FOREIGN PATENT DOCUMENTS

0246828 11/1987 European Pat. Off. .
0491075 6/1992 European Pat. Off. .

OTHER PUBLICATIONS

Akgun et al. Jour. Mat. Science, 27 (Mar. 1992) 1404.
Liu et al. Surface & Coating Tech. 57 (1993) 191.
D'Anna et al. Jour. Appl. Phys. 69 (1991) 1687.

*Primary Examiner*—Upendra Roy
*Attorney, Agent, or Firm*—Sughrue, Mion, Zinn, Macpeak & Seas

[57] ABSTRACT

A method of nitriding a piece made of titanium alloy, in which a laser beam is directed onto the piece to obtain a small amount of surface melting in the impact zone of the laser, nitrogen under high pressure is blown immediately behind the impact zone of the laser beam so that the nitrogen penetrates into the impact zone once it has become semi-solid, and an inert gas is blown around the nitrogen so as to cover and overlap the laser impact zone. The apparatus of the invention includes a central tube for conveying the nitrogen and a circularly symmetrical duct around the axis of the central tube having inside and outside walls that are conical and that serve to convey the inert gas. The invention serves to obtain a hard surface layer having a thickness of 1 mm to 2 mm.

3 Claims, 2 Drawing Sheets

LASER NITRIDING AN ELEMENT MADE OF TITANIUM ALLOY BY BLOWING NITROGEN AND INERT GAS

The present invention relates to a method of nitriding a piece made of titanium alloy.

BACKGROUND OF THE INVENTION

Nitriding serves to harden the surface of metal pieces.

Several hardening methods exist that are implemented in static environments, i.e. without significant motion. In particular, there is nitriding by means of gas, a bath of salts, powder, and by means of ion nitriding. More recently, a technique of ion implantation has been proposed.

Those methods enable a layer having a thickness of 1 to 2 tenths of a millimeter to be hardened on alloys of titanium.

There also exists a non-static method in which a laser beam that is movable relative to the piece is directed onto the piece and procures a small amount of surface melting in the impact zone, nitrogen is blown onto the piece in a direction that remains fixed relative to the direction of the laser beam, and an inert gas is also blown onto the piece(EP-A-0 491 075).

In that method, the nitrogen is mixed with the inert gas and both the laser beam and the nitrogen-inert gas jet converge on the piece so that the gaseous mixture strikes the liquid zone. To prevent said zone being converted into a spray, it is necessary to limit the pressure of the gas jet.

The above method has made it possible to obtain hardening over a thickness of 0.4 mm to 1 mm on a piece made of titanium alloy.

SUMMARY OF THE INVENTION

The method of the invention makes it possible to obtain hardening over a much greater thickness (1 mm to 2 mm) wherein nitrogen is blown under high pressure immediately behind the zone impacted by the laser beam so that the nitrogen penetrates into the zone once it has become semi-solid, and wherein the immersed gas is blown around the stream of nitrogen so that said stream covers and overlaps the zone impacted by the laser.

The nitrogen jet does not converge with the laser beam in the impact zone but strikes said zone after it has become semi-solid, such that a ratio of N atoms to Ti atoms is obtained lying in the range 15% to 35% and is necessary for obtaining good hardness (800 HV) without giving rise to a brittle film.

The jet of nitrogen (not mixed with the inert gas) is at a high pressure (4 bars to 12 bars) so as to penetrate into the semi-solid zone down to a depth of 1 mm to 2 mm. It does not destroy the impact zone since it is semi-solid.

The inert gas keeps oxygen away from the treated zone; in addition, the jet of inert gas at low pressure (1 bar to 2 bars) entrains the nitrogen jet so that the nitrogen diffuses a little into the inert gas, thereby reducing the formation of surface dendrites that make the surface fragile.

Contact between the fast nitrogen jet and the slow peripheral jet of inert gas sets up turbulence in the inert gas which improves its sweeping of oxygen.

Furthermore, it has been found that because the zone struck by the nitrogen jet is in a semi-solid state, $Ti_2N$, $Ti_3N_2$, and $Ti_4N$ compounds are formed having very fine grains, thereby avoiding cracking in operation.

The present invention also relates to apparatus for blowing nitrogen and inert gas to enable the periphery of the nitrogen jet to diffuse into the stream of inert gas with the nitrogen jet setting up turbulence in the inert gas.

The apparatus of the invention comprising a central tube serving to convey the nitrogen, and a circularly symmetrical duct about the axis of the central tube having inside and outside walls that are conical, the inside wall bearing against the central tube, and the outside walls projecting beyond the end of the tube and being terminated by a diverging portion, said duct serving to convey the inert gas.

BRIEF DESCRIPTION OF THE DRAWINGS

The invention is now described in greater detail with reference to a particular embodiment given by way of non-limiting example and shown in the accompanying drawings, in which.

MORE DETAILED DESCRIPTION

Figure 1:
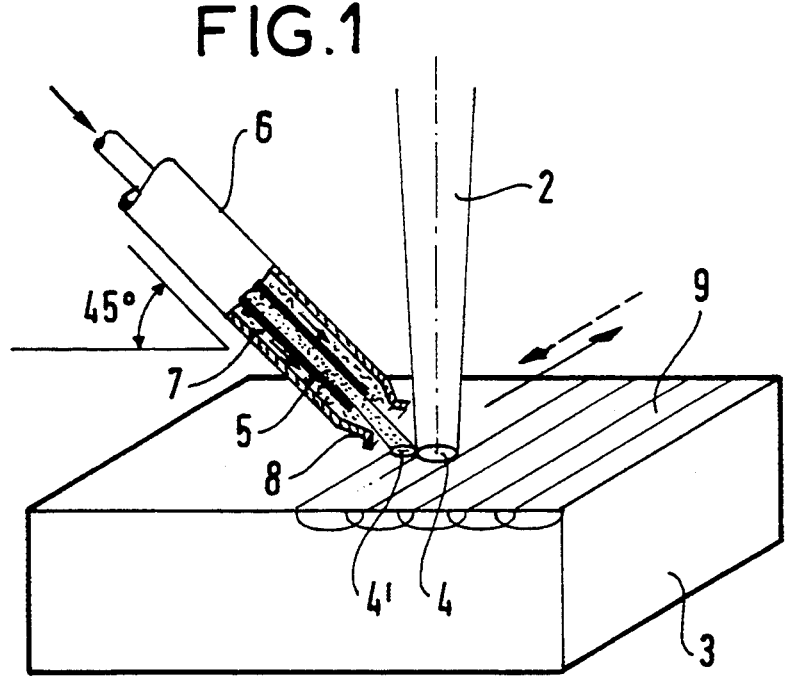
FIG. 1 shows the means necessary for applying the method of the invention.
Figure 2:
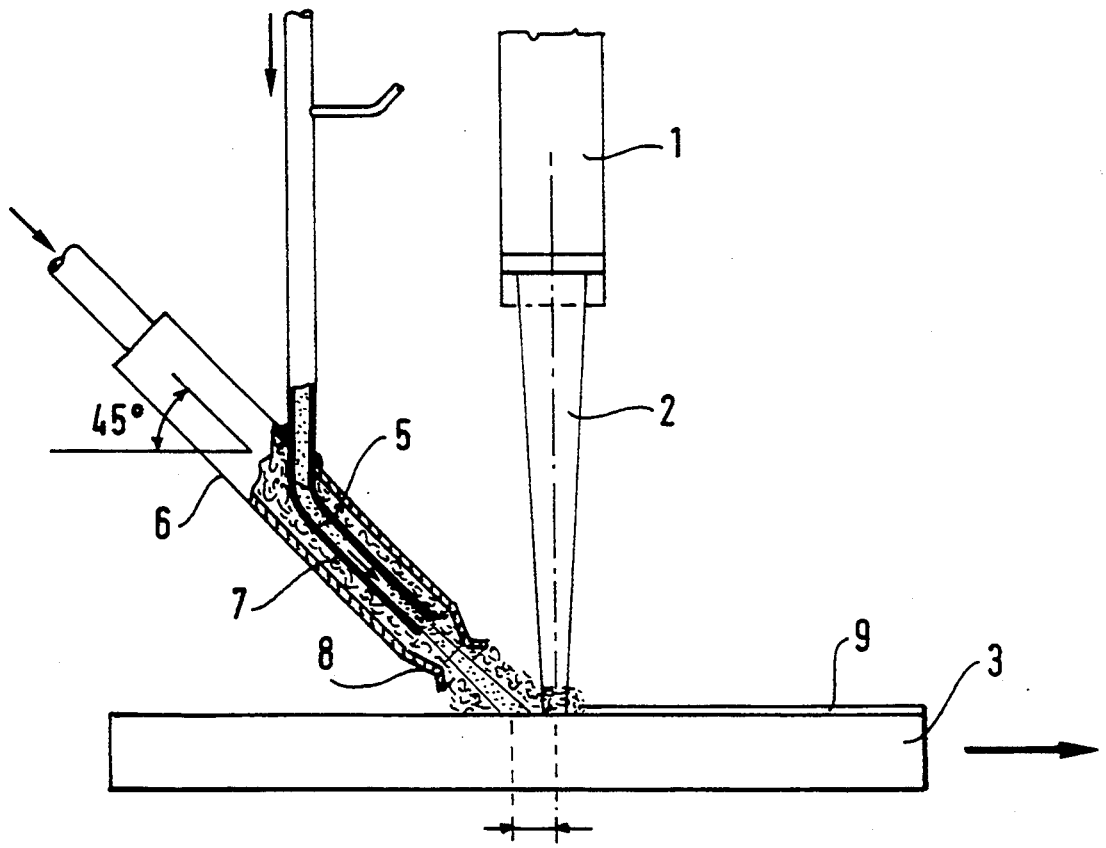
FIG. 2 is a section through FIG. 1.

In the method of the invention, a power laser 1 (e.g. a $CO_2$ or a YAG laser) is used whose beam 2 vertically strikes a piece 3 made of titanium alloy that is situated at a short distance from the laser 1 (less than 40 mm, see FIGS. 1 and 2). The hardness of the piece 3 is about 300 HV. The beam 2 is slightly unfocused and the unfocusing of the beam, the power of the beam, and the displacement speed of the piece 3 (along the arrow) are adjusted so as to obtain a small amount of surface melting of the substrate in a zone 4 in the form of a patch having a diameter of 2 mm to 3 mm and a depth of 1 mm to 2 mm.

Nitrogen under high pressure is blown through a small-diameter (2 mm to 5 mm), nozzle-type cylindrical tube 5 immediately beyond the zone 4. The tube 5 is inclined at an angle in the range 30° to 60° relative to the vertical, and preferably equal to 45°.

An envelope 6 having the same axis of the tube 5 is disposed around the tube 5 and the space 7 between the tube 5 and the envelope 6 is fed with an inert gas, helium or preferably argon, at low pressure (1 bar to 2 bars).

The envelope 6 extends beyond the end 7 of the tube 5 and is followed by a converging portion that terminates in a diverging portion 8.

The argon is caused to be turbulent and it overlies and spreads into the zone 5.

The argon is essential for countering the oxygen of the surrounding air during surface melting, so it is necessary to apply it before melting begins. Contact between the beam 2 and the piece 3 takes place in an atmosphere of inert gas. The various parameters are adjusted so that when the zone 4 comes beneath the jet of nitrogen, the metal is no longer in the liquid state, but is semi-solid.

By adjusting the nitrogen pressure to within the range 4 bars to 12 bars (i.e. at a speed lying in the range 20 meters per second (m/s) to 70 m/s), the nitrogen is caused to penetrate into said zone that has become semi-solid down to a depth of 1 mm to 2 mm, and a surface hardness of 800 HV is obtained.

The speed of the argon is low (1 m/s to 2 m/s), but its flow rate is chosen to be sufficient to ensure that the impact spot of the argon on the piece 3 forms a circle having a diameter of 40 mm.

The piece 3 is thus coated by performing a series of adjacent passes 9 of width 2 mm to 3 mm.

The speed of advance of the piece 3 may lie in the range 40 meters per minute (m/min) to 60 m/min, for power at a level of 3 kW. The nitrogen impact zone 4' lies not more than half a second behind the impact zone 4 of the beam 2. The zones 4 and 4' are preferably tangential.

The treated piece 3 has a gold-colored surface. In the thickness direction, there can be seen a stack comprising a surface layer of TiN followed by a layer of $Ti_2N$ followed by increasing enrichment of the a phase of the substrate with the complex phases $Ti_3N_2$ and $Ti_4N_3$.

The density of nitrogen atoms is 15% to 35% relative to Ti atoms.

Surface hardness is about 800 HV. At a depth of 2 mm, the usual hardness of the substrate is to be found. If the titanium alloy is a TA6V, then the hardness is about 300/320 HV. In addition, a slightly harder beta-type structure of said alloy that is derived from thermal transformation during remelting may be interposed between the nitrided portion and the alpha/beta-type TA6V structure.

It may be observed that less surface dendritic TiN is to be found than usual. This is due, in particular, to the nitrogen being diluted in argon.

Figure 3:
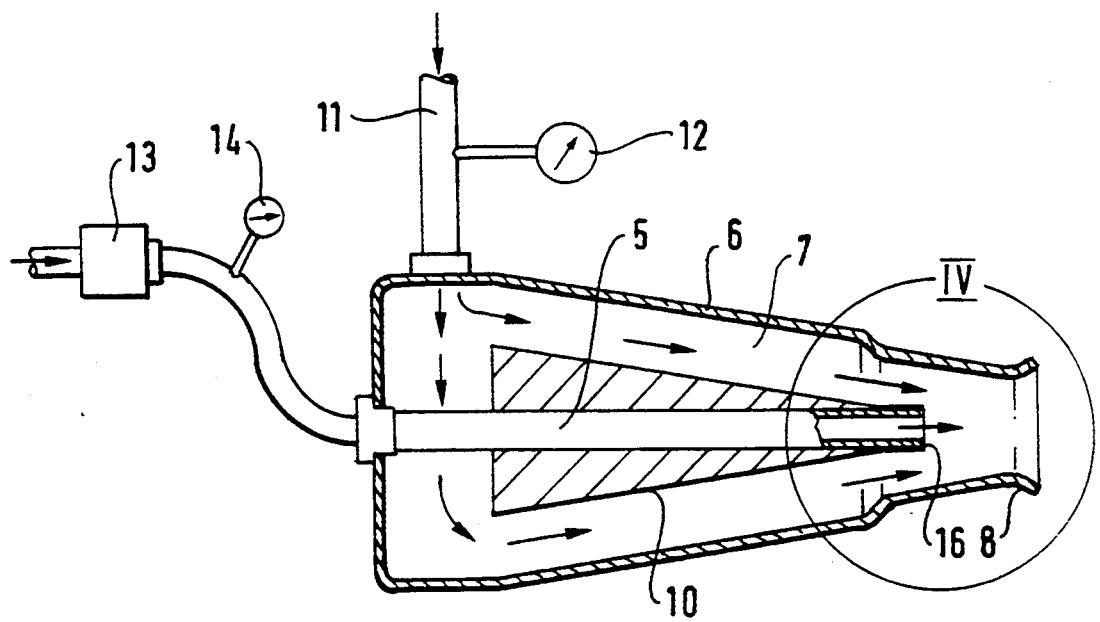
FIG. 3 shows a device for blowing nitrogen and inert gas.
Figure 4:
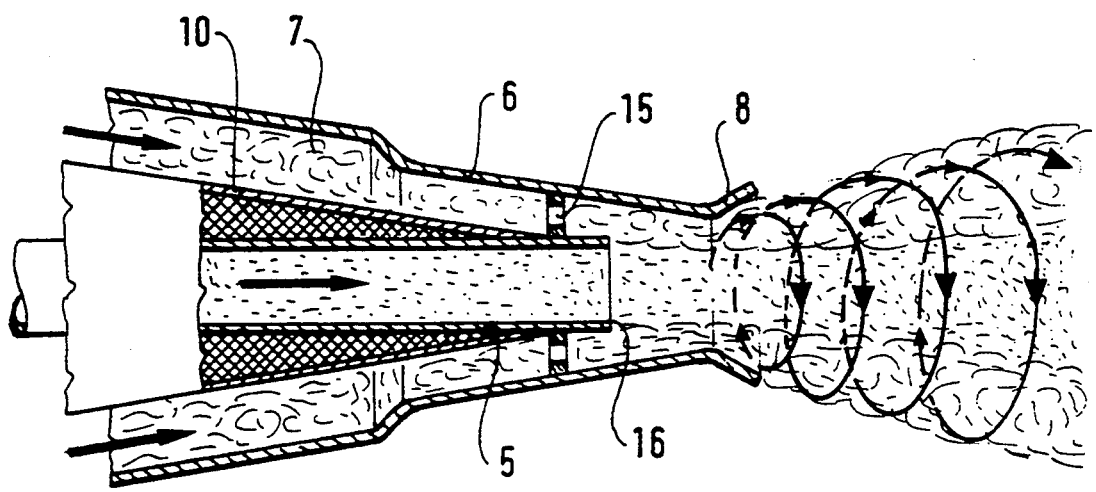
FIG. 4 is a detail view of FIG. 3.

A device of the invention for blowing nitrogen and argon, as shown in FIGS. 3 and 4, comprises a small diameter central tube 5, with a conical inner envelope 10 engaged over the end portion of the tube, and a converging conical outer envelope 6 having the same axis as the tube 5 and terminated by a diverging portion 8. The argon surrounds the nitrogen and prevents it from expanding in all directions.

An argon duct fills the space 7 between the inner envelope 10 and the outer envelope 6.

A flow meter 12 serves to verify the argon flow rate. A compressor 13 puts the nitrogen under pressure and feeds the tube 5, with the nitrogen flow rate likewise being checked by means of a flow meter 14.

Fins 15 are disposed between the outer envelope 6 and the tube 5 in the vicinity of the end 16 of the tube 5. The fins 15 serve to cause the argon flow to spin and said flow is made turbulent by the nitrogen in the vicinity of the diverging portion 8 flowing faster than the argon. The argon surrounds the nitrogen and prevents it from expanding in all directions.

All of the pipework conveying the gases is made of stainless steel.

I claim:

1. A method of nitriding an element made of a titanium alloy, in which a laser beam which is movable relative to the element is directed onto the element causing a small amount of surface melting in zone impacted by the laser, nitrogen being blown onto the element in a direction fixed relative to a direction of the laser beam, and an inert gas being blown onto the element, comprising the steps of:

blowing a stream of nitrogen under high pressure immediately behind the zone impacted by the laser beam so that the nitrogen penetrates into the zone once a surface melt in the zone has become semi-solid;

blowing said inert gas around said stream of nitrogen so as to cover and overlap both the zone being impacted by the laser and said semi-solid surface melt.

2. A method according to claim 1, wherein the pressure of said stream of nitrogen lies in the range 4 bars to 12 bars, and the pressure of said inert gas lies in the range 1 bar to 2 bars.

3. A method according to claim 2, wherein said stream of nitrogen sets up turbulence in the inert gas.

* * * * *